(12) United States Patent
Shen et al.

(10) Patent No.: US 8,371,856 B2
(45) Date of Patent: Feb. 12, 2013

(54) GAME BOX WITH REPLACEABLE FIGURE BOARDS

(75) Inventors: Ju-Yu Shen, Kaohsiung (TW); Li-Ching Huang, Tainan (TW)

(73) Assignee: Ju-Yu Shen, Kaohsiung (TW)

( * ) Notice: Subject to any disclaimer, the term of this patent is extended or adjusted under 35 U.S.C. 154(b) by 351 days.

(21) Appl. No.: 12/721,162

(22) Filed: Mar. 10, 2010

(65) Prior Publication Data

US 2011/0223566 A1    Sep. 15, 2011

(51) Int. Cl.
*G09B 19/22*    (2006.01)
(52) U.S. Cl. ........................................................ 434/128
(58) Field of Classification Search .................... 434/128
See application file for complete search history.

(56) References Cited

U.S. PATENT DOCUMENTS

| | | | | |
|---|---|---|---|---|
| 3,275,392 A | * | 9/1966 | Fiterman | 312/108 |
| 4,854,461 A | * | 8/1989 | Daniel et al. | 220/4.01 |
| 5,185,952 A | * | 2/1993 | Bruce | 43/57.1 |
| 5,603,558 A | * | 2/1997 | Zimmer | 312/290 |
| 6,254,251 B1 | * | 7/2001 | Washington | 362/154 |
| 6,267,484 B1 | * | 7/2001 | Baker et al. | 362/156 |
| 6,692,091 B2 | * | 2/2004 | Mulaw | 312/245 |
| 6,735,497 B2 | * | 5/2004 | Wallace et al. | 700/231 |
| 7,046,145 B2 | * | 5/2006 | Maloney | 340/568.1 |
| 7,415,794 B1 | * | 8/2008 | Thompson | 43/54.1 |
| 7,866,769 B2 | * | 1/2011 | Ahlgrim et al. | 312/108 |
| 7,909,685 B2 | * | 3/2011 | Heim et al. | 454/184 |
| 2002/0105252 A1 | * | 8/2002 | Dorman | 312/257.1 |
| 2011/0074255 A1 | * | 3/2011 | Ahlgrim et al. | 312/107 |

* cited by examiner

*Primary Examiner* — Kurt Fernstrom
*Assistant Examiner* — Dolores Collins
(74) *Attorney, Agent, or Firm* — Muncy, Geissler, Olds & Lowe, PLLC

(57) ABSTRACT

A game box includes a box and a drawer is located in the lower space of the box and includes at least one chamber. The box includes an operation portion protruding in the upper space of the box and multiple slots are defined in an inside of the operation portion. At least one figure board slides in the slots and a light source is located in the box. The light of the light source goes through the at least one figure board. The at least one figure board includes holes which are located corresponding to the multiple areas of the map on the at least one figure board. At least one index member is received in the at least one chamber of the drawer and the players insert the index member into the correct hole in the at least one figure board.

11 Claims, 12 Drawing Sheets

US 8,371,856 B2

GAME BOX WITH REPLACEABLE FIGURE BOARDS

FIELD OF THE INVENTION

The present invention relates to a game box, and more particularly, to a game box for children learning by using figure boards and index members.

BACKGROUND OF THE INVENTION

Maps are a good way to learn the different countries in the world and even the ports, the cities, the dams, the national parks, the produces, the airports and the people of different areas on the earth. There are several different games are designed to allow the children to learn these knowledge during games.

A learning game known to the applicant includes a base on which a light transmittable board is connected to different areas on the base. A light source is located below the board and multiple light emitting members are connected to the board. Each light emitting member is located corresponding to a limit switch which protrudes above the board. Each correspondence light emitting member and the limit switch are connected to a circuit board. Multiple figure puzzles which are shaped according to the geographic characters or different areas and the players have to correctly put the puzzles on the board. By pressing the puzzles, the limit switches are activated and the light emitting members light up to let the players to see the specific figures of the puzzles. By this way, the players learn by the figures on the puzzles during playing.

However, the conventional game does not mention any of the culture or scenes of that country and this makes the players feel boring.

SUMMARY OF THE INVENTION

The present invention intends to provide a game that provides a wide range of information of the areas or countries by correctly installing the index members to correct holes in the boards.

The present invention relates to a game box which comprises a box with a drawer connected to the lower space thereof and the drawer includes at least one chamber. An operation portion protrudes in the upper space of the box and multiple slots are defined in an inside of the operation portion. At least one figure board slides in the slots and a light source is located in the box and the light goes through the at least one figure board. At least one index member is received in the at least one chamber of the drawer and each of the at least one index member is designed corresponding to the one of the at least one figure board.

The at least one figure board has a map marked thereon and the map includes multiple areas.

The at least one figure board includes holes which are located corresponding to the multiple areas of the map. A transparent base board is slid in the slots and located below the at least one figure board. The at least one index member is inserted into the hole and contacts the base board.

The at least one figure board may have tubes located corresponding to the multiple areas of the map, and the at least one index member is inserted into the tube.

The at least one figure board has first connectors which are located corresponding to the multiple areas of the map, and the at least one index member includes a second connector.

The first and second connectors are magnets or connection strips.

The present invention further includes a storage box which includes at least one storage slot.

The light source is a fluorescent tube or light emitting diode.

The at least one figure board includes a basic figure board, multiple topic boards and a base board, wherein the topic boards includes figures and holes.

Alternatively, the at least one figure board includes a basic figure board, multiple topic boards, a combination board and a base board, wherein the topic boards includes figures and the combination board includes holes which are located corresponding to the figures of the topic boards.

The present invention includes the following advantages:
1. By playing the game box, the players learn different cities, cultures and life styles of different areas and countries.
2. There are multiple index members so that the players are trained to organize different types of parts.
3. The players learn the geographic relationship between different cities and counties.
4. The players learn the roads, products, special spots and cultures of different areas and counties.
5. The present invention provides a storage box for storage of the boards, index members and other parts so that the pasts are conveniently organized and prevented from lost.
6. The present invention includes different topic boards which can be combined with other topic boards to have different topics which are suitable for the players of different ages.
7. The present invention can be made to have different sizes, smaller ones are designed for indoor use and larger ones are designed for outdoor use.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
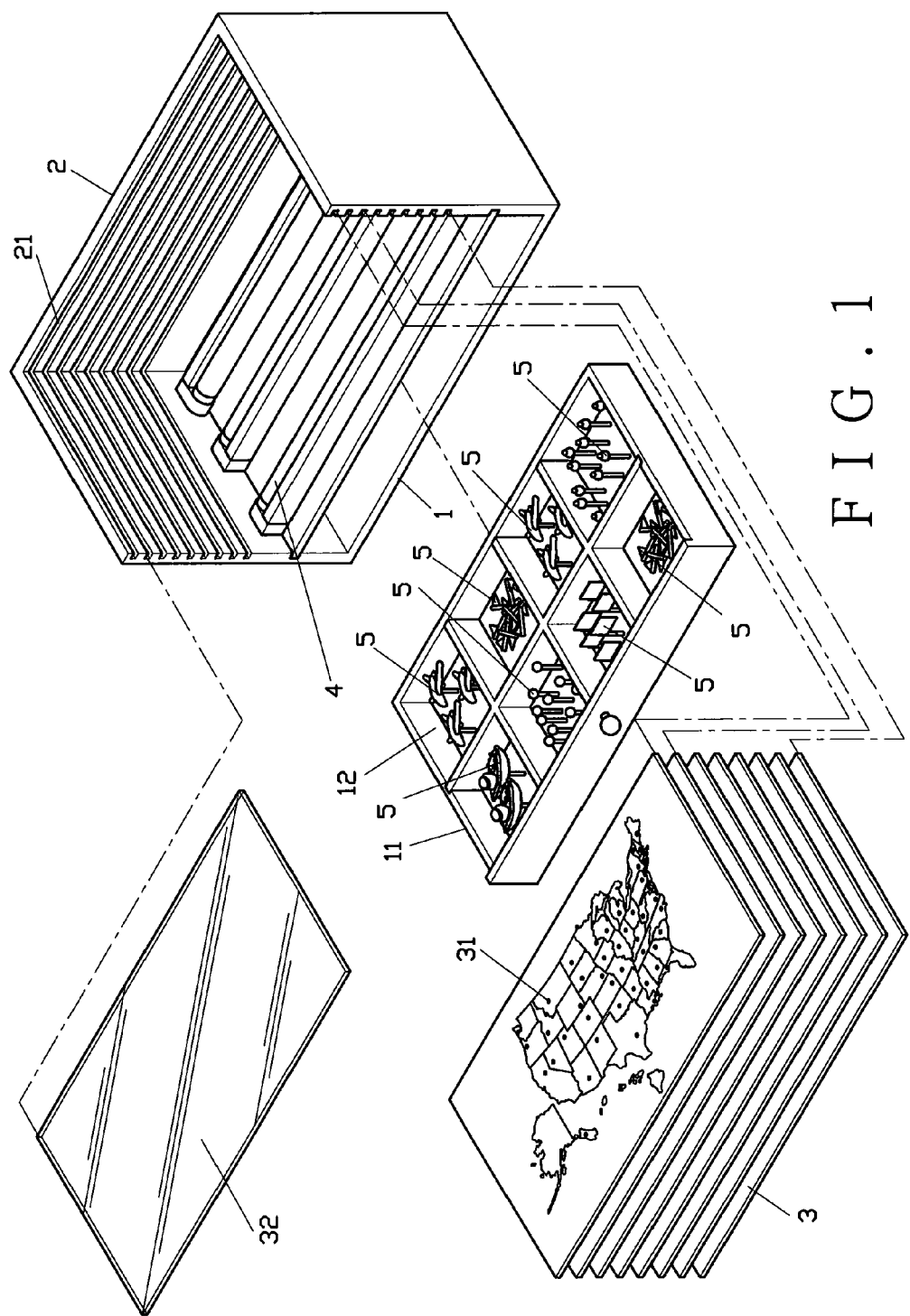
FIG. 1 is an exploded view to show the game box of the present invention.

Referring to FIG. 1, the game box of the present invention comprises a box 1, an operation portion 2, at least one figure board 3, a light source 4 and at least one index member 5.

The box 1 includes an upper space and a lower space, and a drawer 11 is located in the lower space and includes at least one chamber 12.

The operation portion 2 protrudes in the upper space of the box 1, and multiple slots 21 are defined in an inside of the operation portion 2.

The figure board 3 is slid in one of the slots 21 of the operation portion 2 and has a map marked thereon. The map includes multiple areas. The map can be a map of any country, state or area in the world. The figure board 3 includes holes 31 which are located corresponding to the multiple areas of the map. A transparent base board 32 is slid in one of the slots 21 and located below the figure board 3. The index member 5 is inserted into the relative hole 31 and contacts the base board 32. The figure board 3 is made of light transmittal material such as plastic or acrylic.

The light source 4 is located between the upper and lower spaces of the box 1 and the light goes through the figure board 3. The light source 4 may include fluorescent tubes or light emitting diodes.

The index members 5 are received in the chambers 12 of the drawer 11 and each of the index members 5 is designed corresponding to one of the figure boards 3. The index members 5 are designed to be inserted into the holes 31 of the figure boards 3.

As shown in FIG. 1, the base board 32 is engaged with the second slot 21 and the figure board 3 is engaged with other slot 21 of the operation portion 2. When in use, the players pull the figure board 3 beneath the base board 32 and leave the first one of the figure boards 3 above the base board 32. The first one of the figure boards 3 can be replaced with other figure boards 3.

Figure 2:
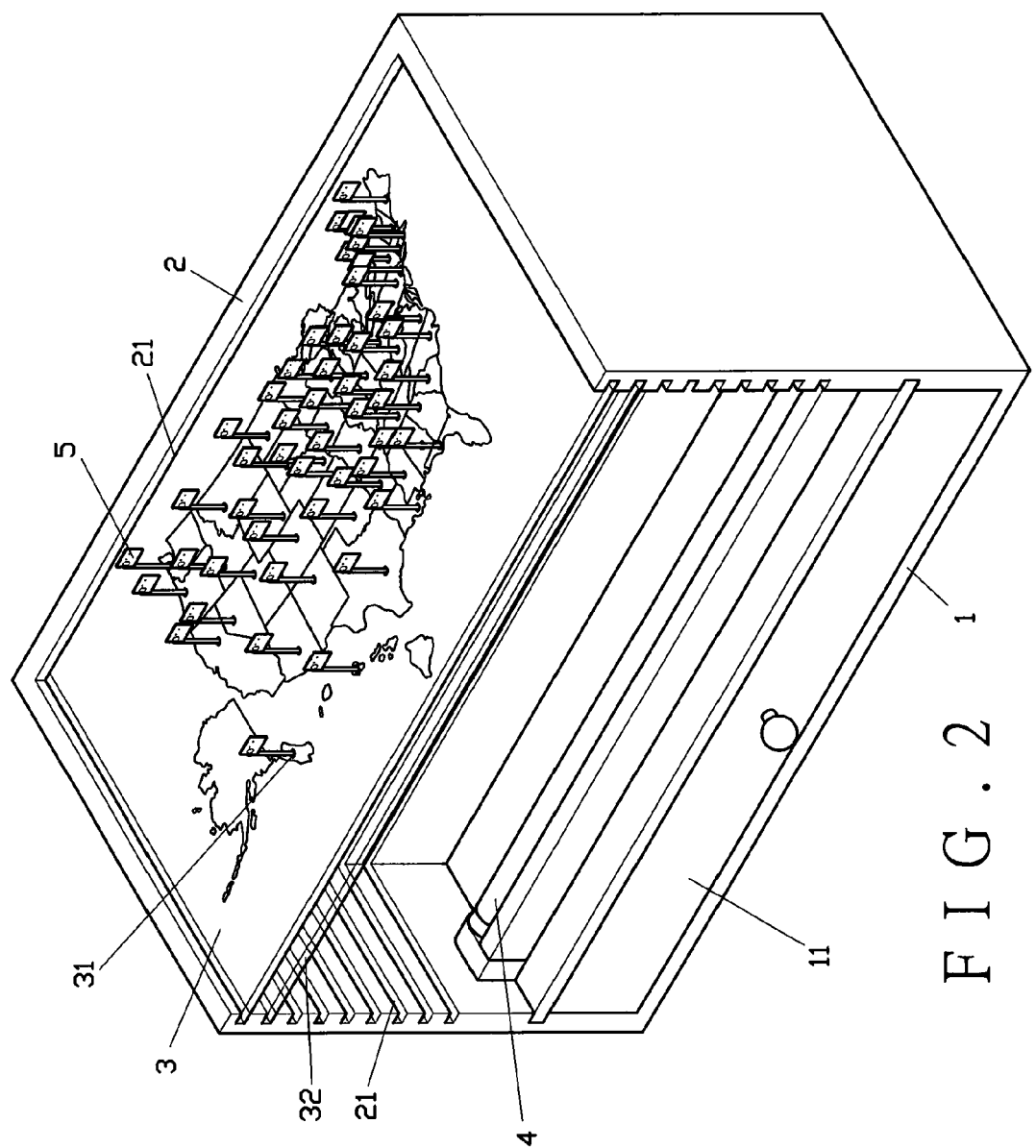
FIG. 2 is a perspective view to show the game box of the present invention.
Figure 3:
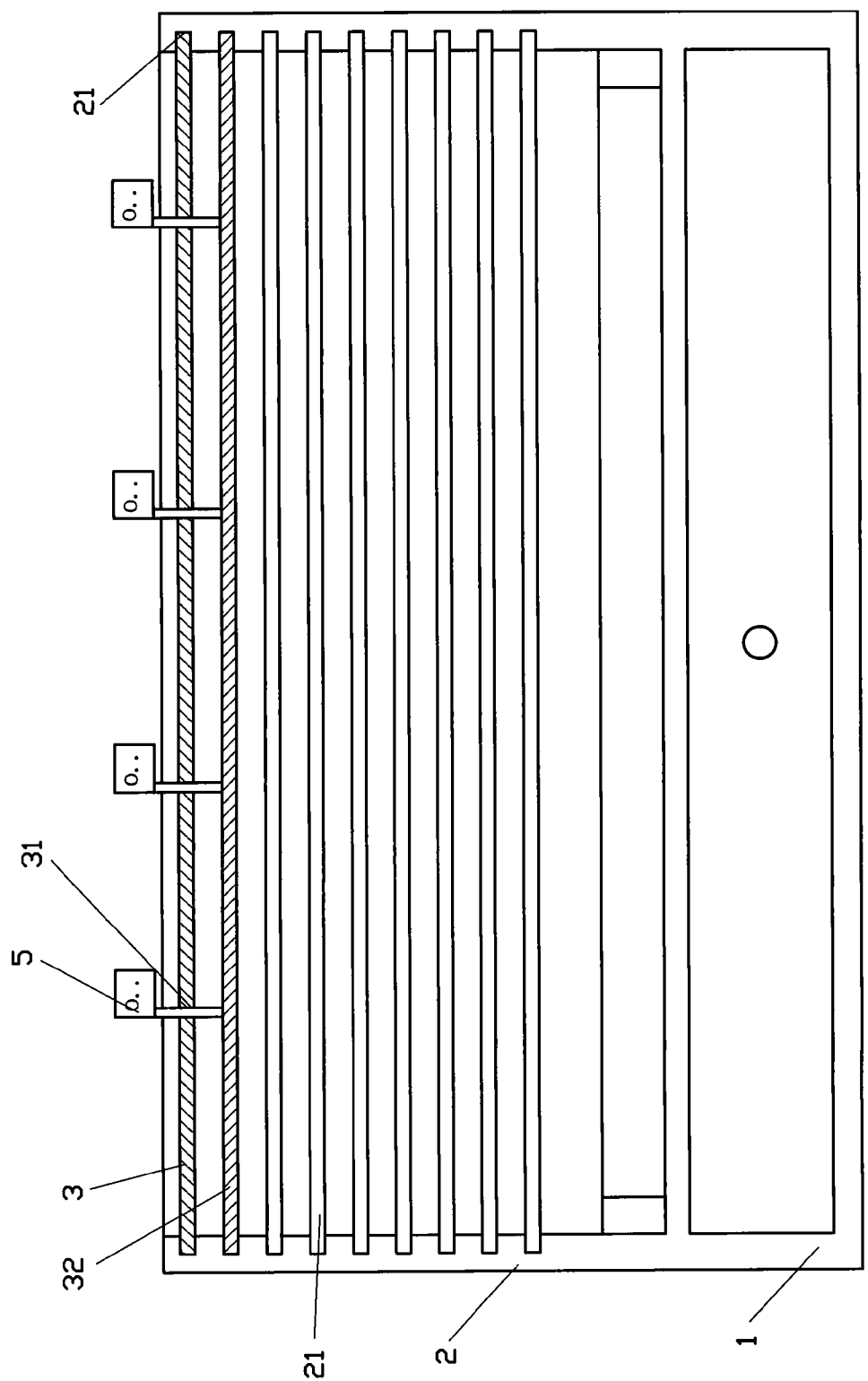
FIG. 3 is a front view of the game box of the present invention when in use.

FIGS. 2 and 3 show that the players insert one figure board 3 to the slot 21 of the operation portion 2 and turn on the light source 4, the light goes through the transparent base board 32 so that the map on the figure board 3 can be clearly seen. The players then pick the index members 5 from the chambers 12 of the drawer 11 and insert the index members 5 into the holes 31. After all the index members 5 are inserted into the holes 31, the players can check that if all of the index members 5 are correctly positioned. During the process, the players learn the knowledge form the map.

Figure 4:
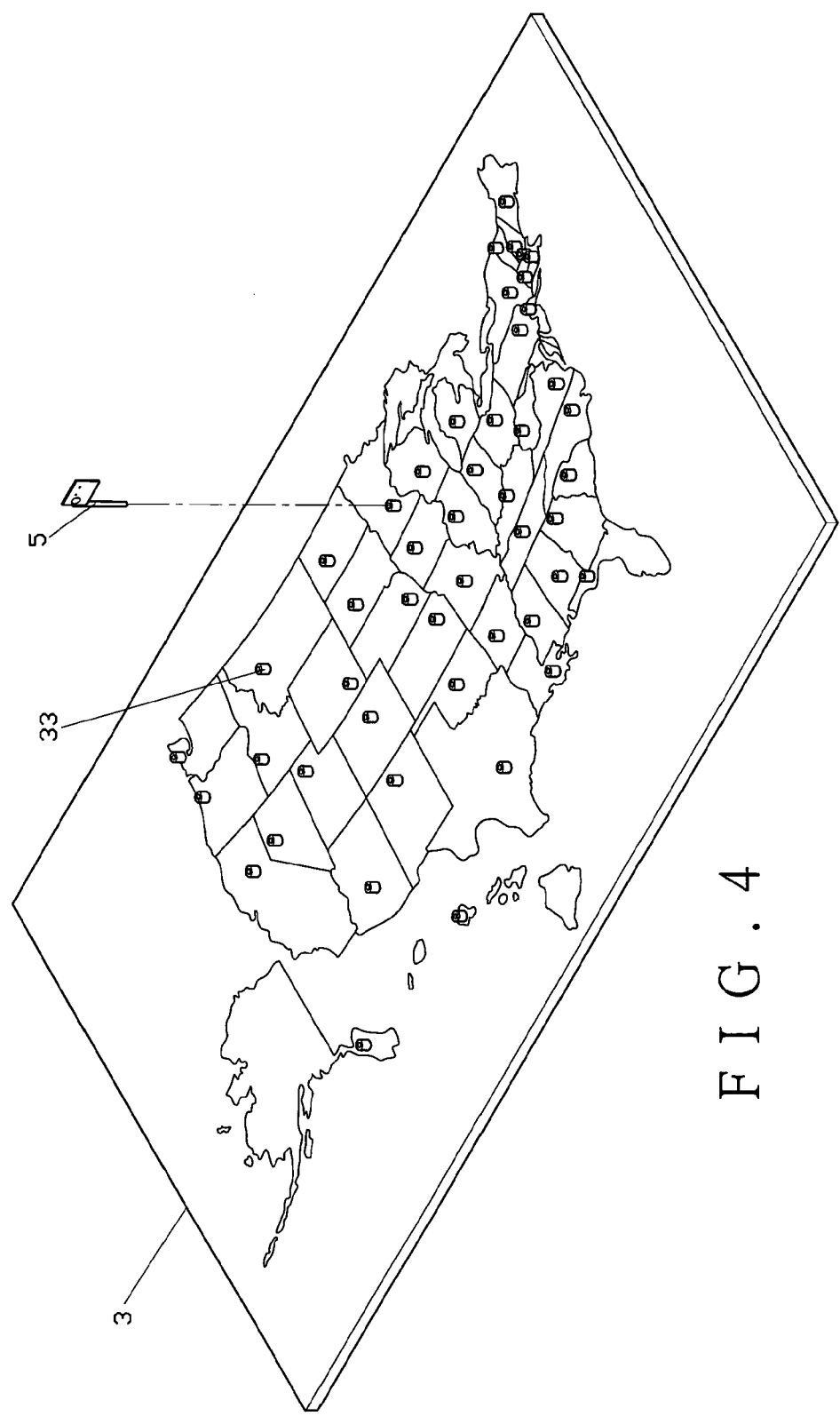
FIG. 4 shows that an index member is to be inserted into the tube on the figure board.

Referring to FIG. 4, the at least one figure board 3 has tubes 33 which are located corresponding to the multiple areas of the map, and the index members 5 is inserted into the tube 33.

Figure 5:
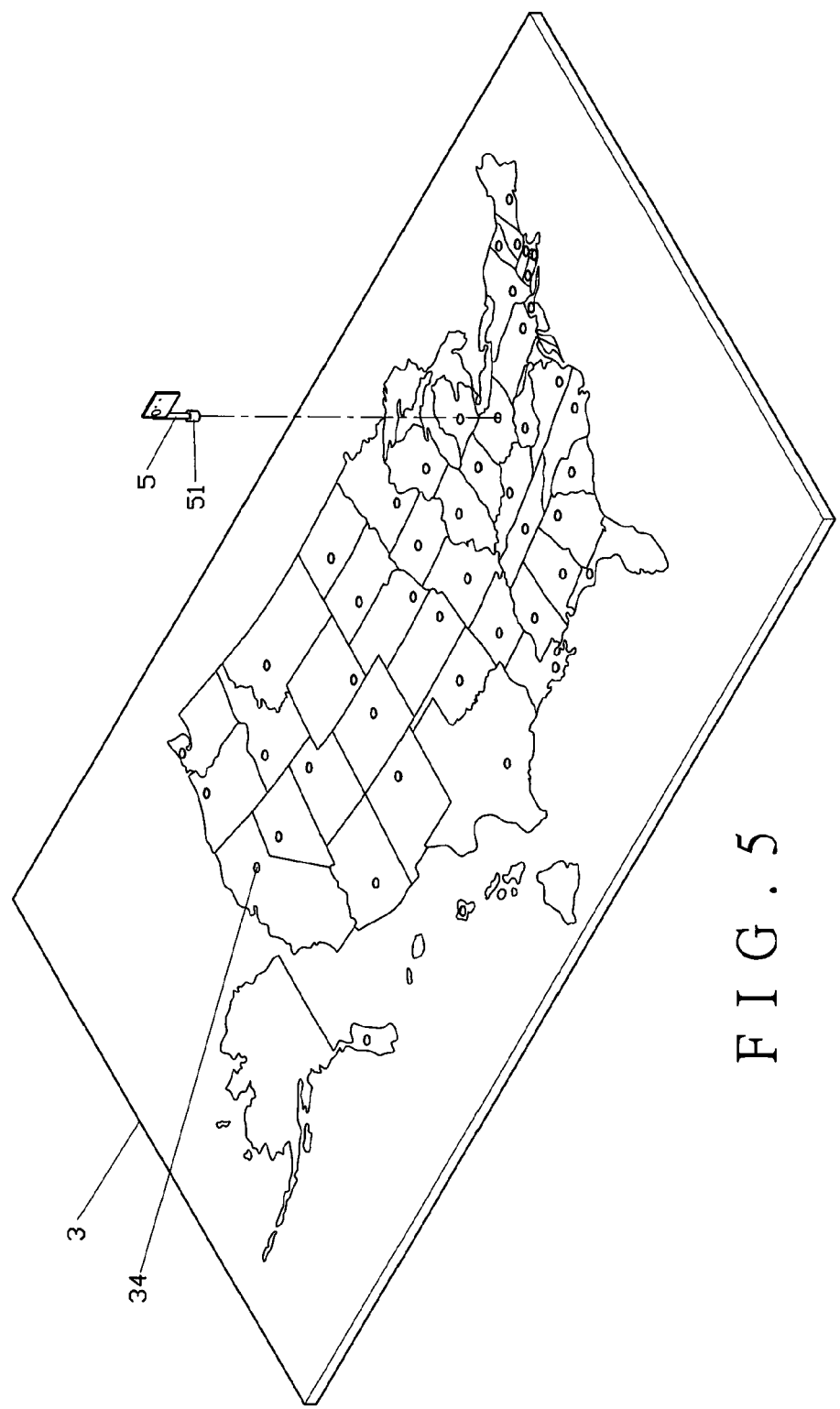
FIG. 5 shows that the first and second connectors have magnets for being connected to each other.

Referring to FIG. 5, the figure board 3 has first connectors 34 which are located corresponding to the multiple areas of the map, and the index member 5 includes a second connector 51. The first and second connectors 34, 51 are able to be connected to each other. The first and second connectors 34, 51 are magnets or connection strips such as Velcro strips.

Figure 6:
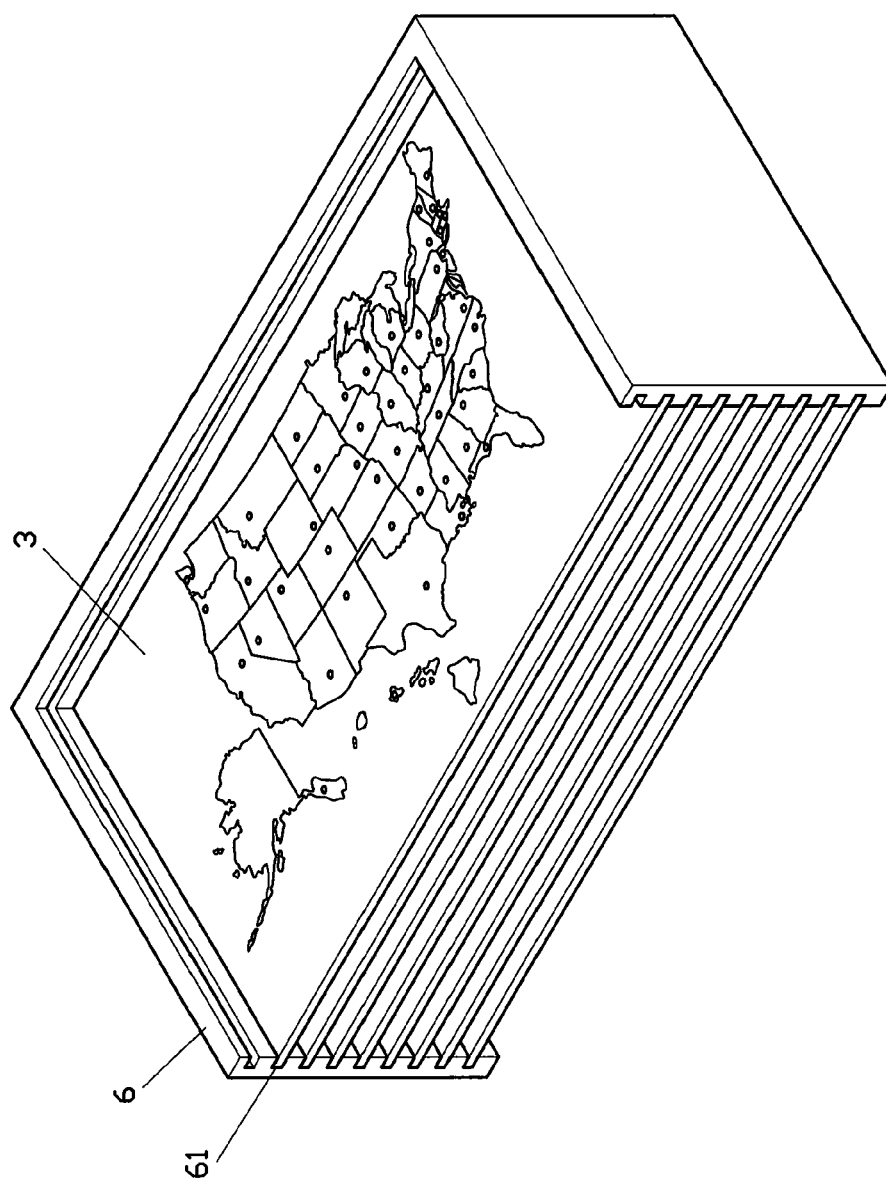
FIG. 6 shows the storage box of the present invention.

Referring to FIG. 6, the present invention provides a storage box 6 which includes storage slots 61 so that the figure boards 3 can be received in the storage slots 61. When in use, only one figure board 3 is picked out from the storage box 6 so that the rest of the figure boards 3 are well organized and avoided from scrubbing to each other.

Figure 7:
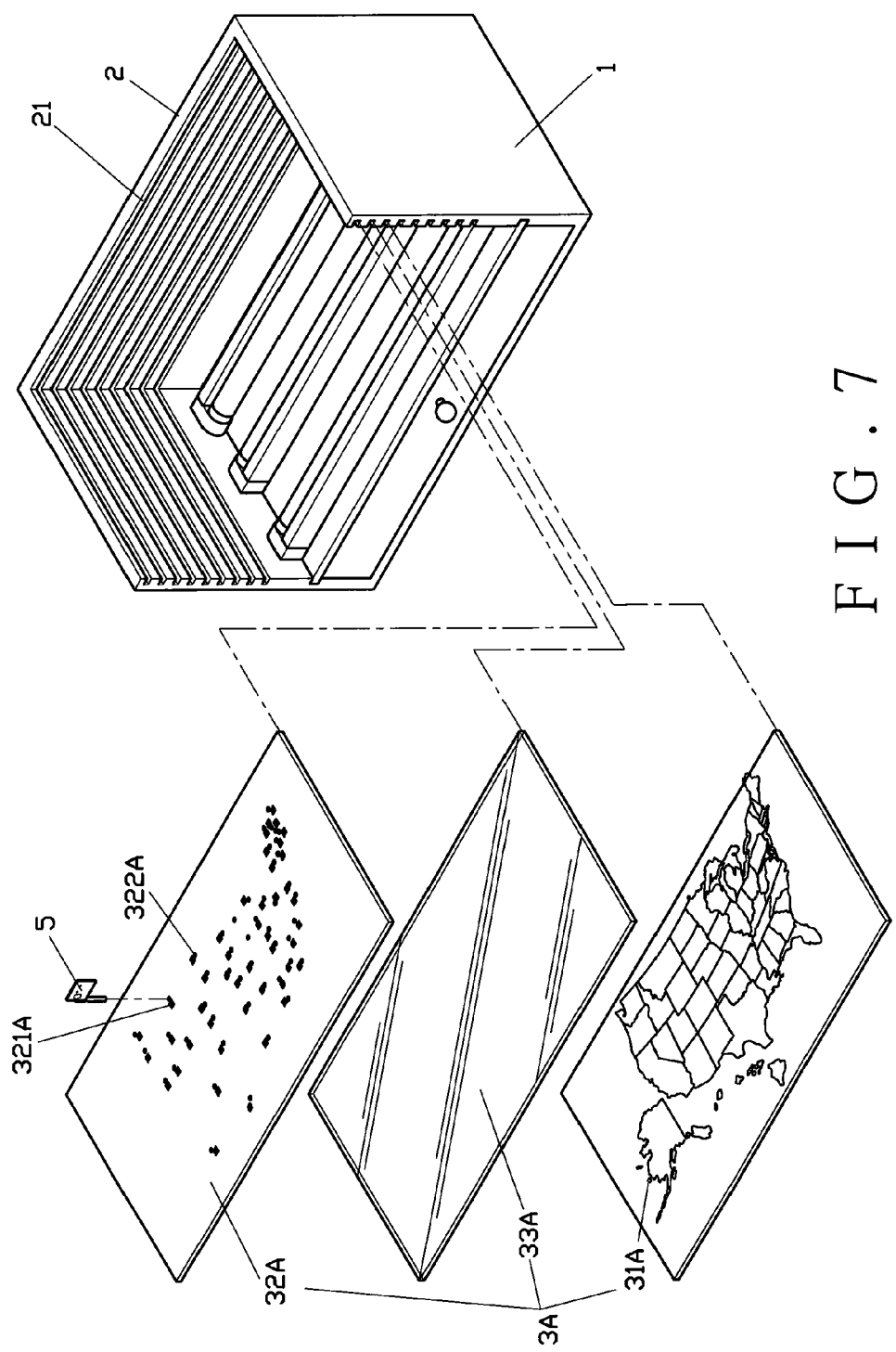
FIG. 7 is an exploded view of the second embodiment of the game box of the present invention.
Figure 8:
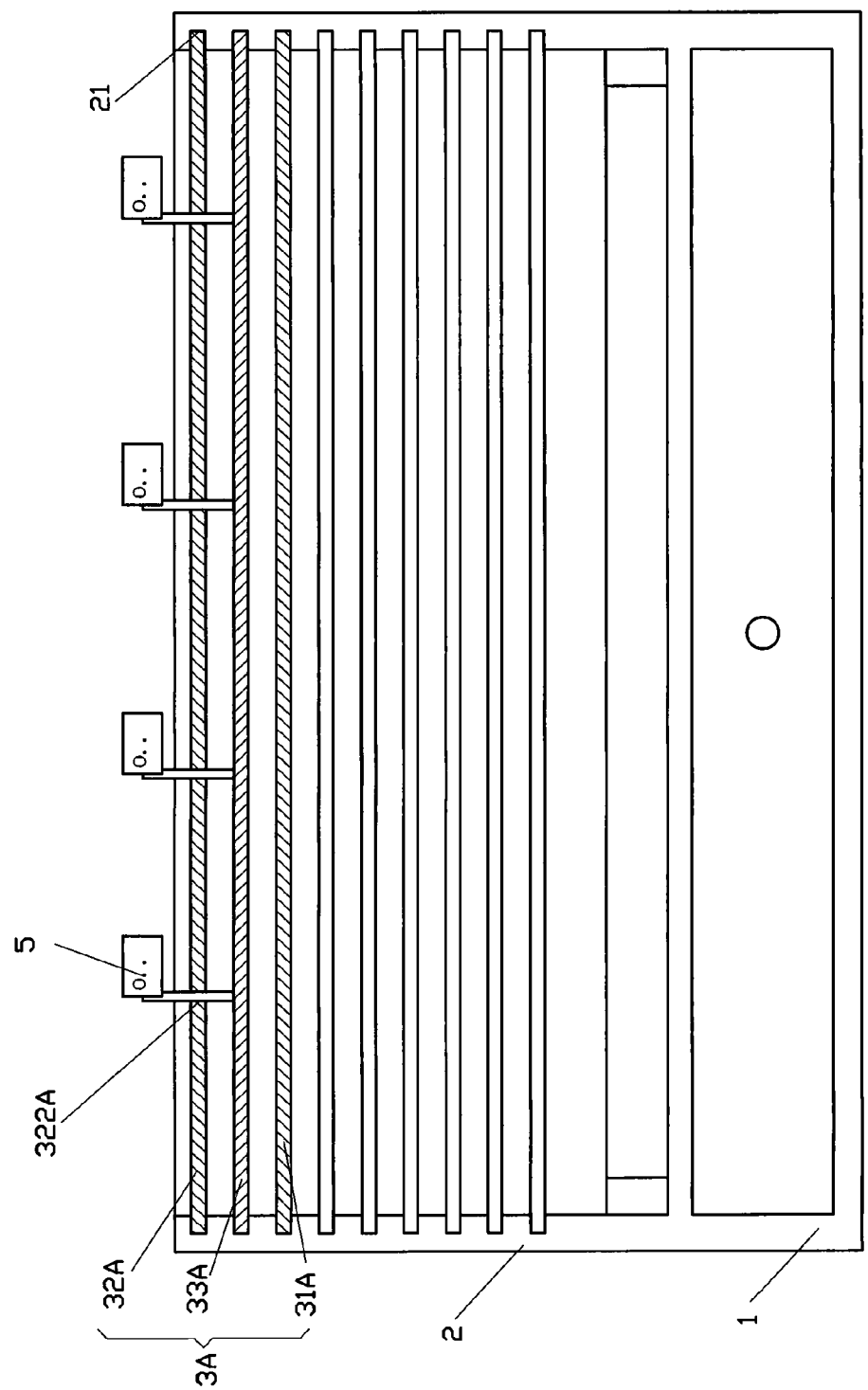
FIG. 8 shows that the index members are inserted in the holes of the figure board of the second embodiment of the present invention.

FIG. 7 and FIG. 8 show the second embodiment of the present invention, wherein the figure board 3A includes a basic figure board 31A, multiple topic boards 32A and a base board 33A. The topic boards 32A include figures 321A and holes 322. The basic figure board 31A is inserted in one of the slots 21 of the operation portion 2 and the base board 33A and the topic boards 32A are inserted above the basic figure board 31A in sequence. The positions of the insertion can be freely adjusted but the slots 21 located on the upper portion are more convenient for use. The basic figure board 31A basically is a map which can be the map of Washington state map, United States map or global map. In this embodiment, the basic figure board 31A shows the map of United States. The topic boards 32A include the figures 321A and the holes 322 of different topics, such as the map of the United States includes states, capitals, harbors, national parks, airports, dams, ruling political parties of the states, products. The topic boards 32A includes the figures 321A that are designed according to the topics mentioned above. Furthermore, the figures 321A include correspondent index members 5 which are inserted into the holes 322A when the answer is correct. The index members 5 pass through the holes 322A and contact the base board 33A.

When in operation, the basic mode is to insert into the slots 21 of the operation portion 2 from lower to upper positions, the sequence is one basic figure board 31A, one base board 33A and one topic board 32A.

Figure 9:
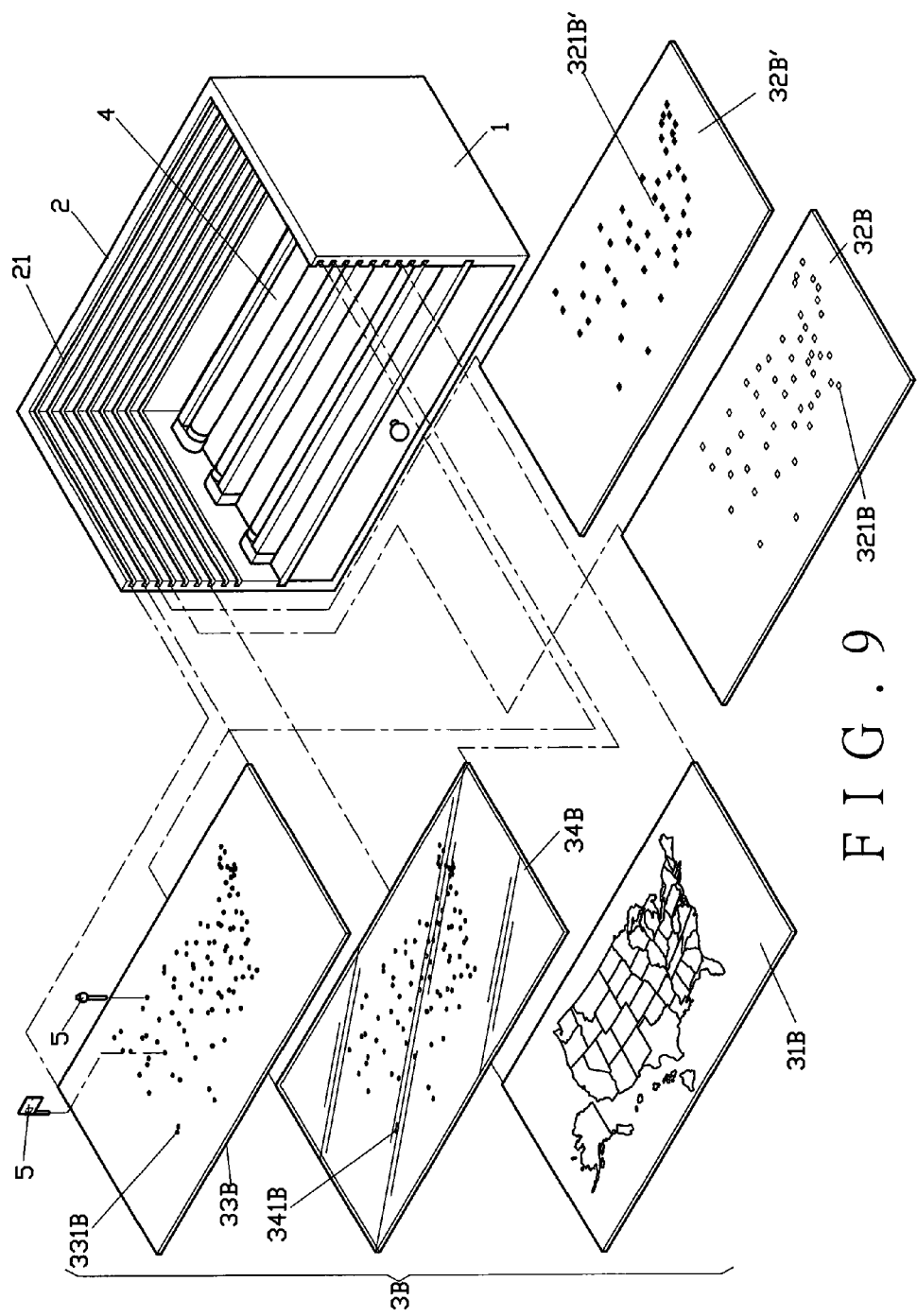
FIG. 9 is an exploded view of the third embodiment of the game box of the present invention.
Figure 10:
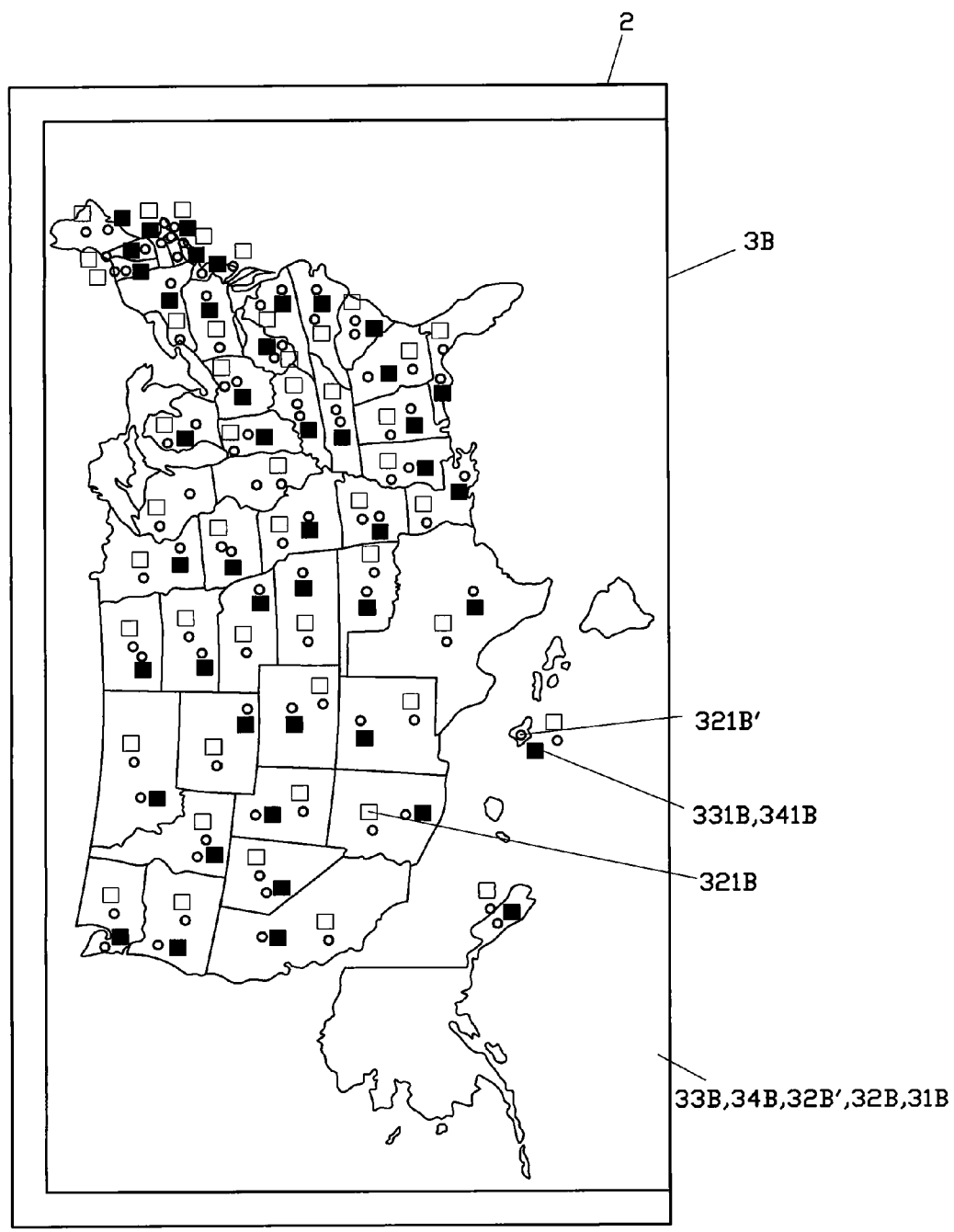
FIG. 10 shows that the topic boards and the combination board are overlapped of the third embodiment of the present invention.
Figure 11:
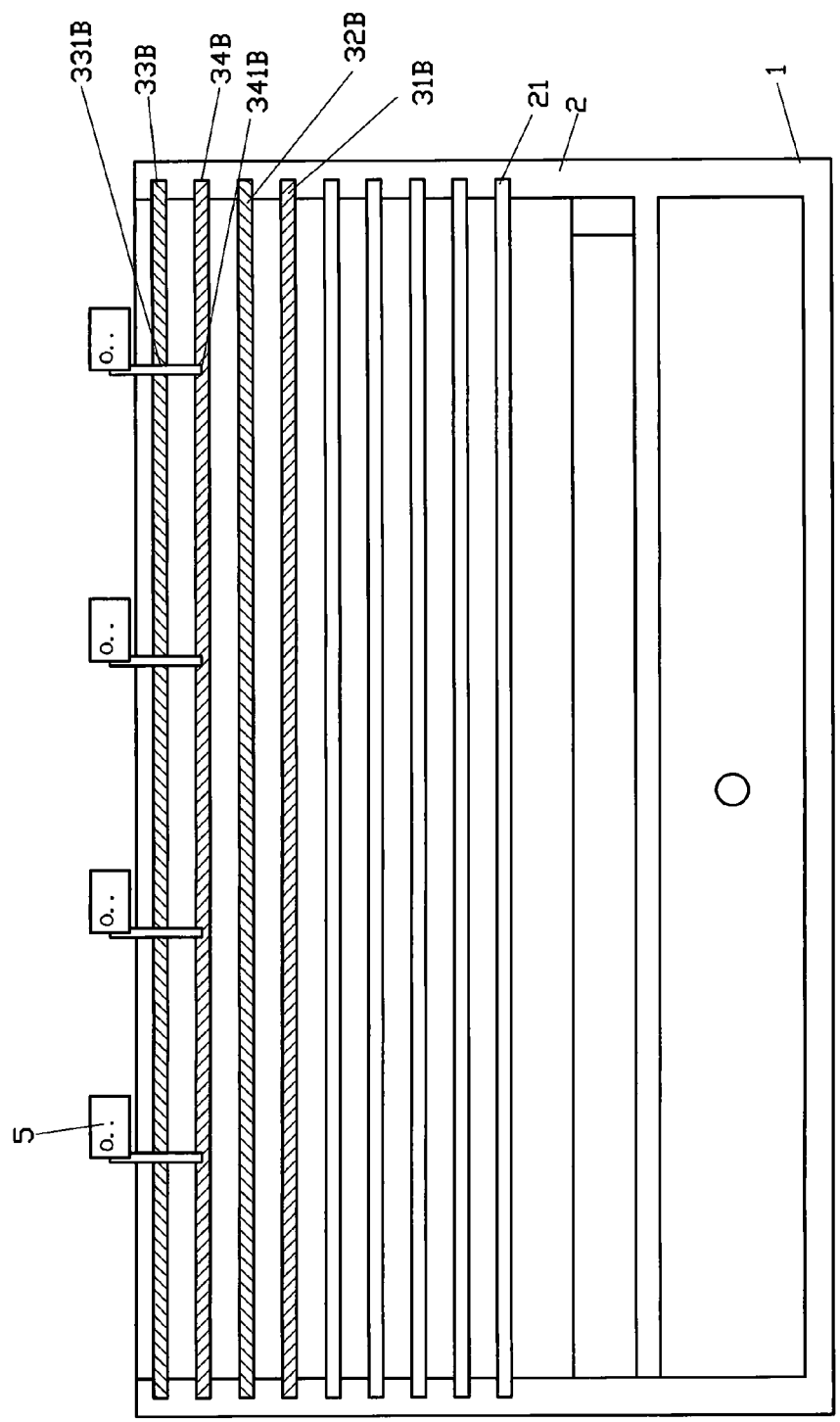
FIG. 11 shows the side view of the use of the third embodiment of the present invention.

The third embodiment as disclosed in FIG. 9 shows that a figure board 3B includes a basic figure board 31B, multiple topic boards 32B, 32B', a base board 34B and a combination board 33B. The basic figure board 31B is inserted into one of the slots 21 of the operation portion 2. The topic boards 32B, 32B', the base board 34B and the combination board 33B are then installed above the basic figure board 31B in sequence. The basic figure board 31B basically is a map which can be the map of Washington state map, United States map or global map. The topic boards 32B, 32B' include figures 321B, 321B' according to the different topics of the basic figure board 31B. The figures 321B, 321B' of the topic boards 32B, 32B' are not overlapped to each other when viewed from top as shown in FIG. 10. The combination board 33B includes holes 331B which are located corresponding to the figures 321B, 321B' of the topic boards 32B, 32B'. Therefore, each of the holes 331B of the combination board 33B is located corresponding to the figures 321B, 321B'. Even if the players use one topic board 32B, or two topic boards 32B, 32B', there is only one hole 331B in the combination board 33B, so that the players are not confused.

As disclosed in the second embodiment, the figures 321B, 321B' disclose the name of the states, capital cities, ports, airports, dams, national parks, products or even the political parties, and there are corresponding index members 5 which are inserted into the holes 331B of the combination board 33B. The index members 5 contact the base board 34B. It is noted that the base board 34B is located beneath the combination board 33B so as to be distinguished from the topic board 32B, 32B'. The base board 34B has recesses 341 which are located corresponding to the holes 331B in the combination board 33B.

The third embodiment of the present invention is a little bit complicated, the combination board 33B is first inserted into the top slot 21 of the operation portion 2, and the base board 34B, the topic boards 32B and the basic figure boards 31B are then inserted to the slots 21 respectively. The players can choose one index member 5 first and then choose multiple index members 5.

Figure 12:
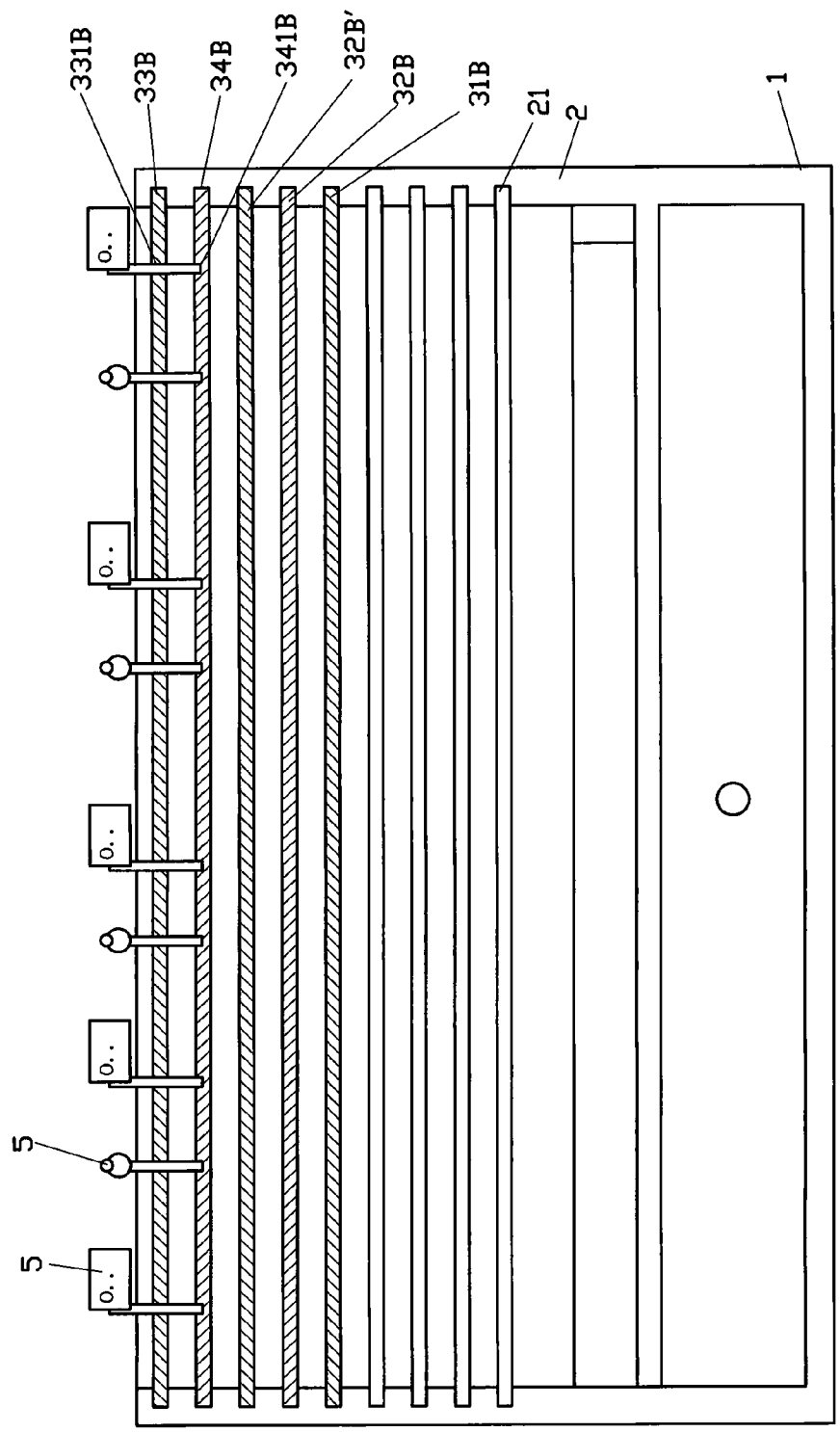
FIG. 12 shows another status of use of the third embodiment of the present invention.

As shown in FIG. 12, two topic boards 32B, 32B' of different topics are inserted between the base board 34B and the basic figure board 31B. The players then have to choose two different index members 5. If all the topic boards 32B, 32B' are used, there will be many combinations and meet different requirements for different players of different ages.

The maps of the basic figure boards 31A, 31B can be designed to have different topic boards 32A, 32B, 32B' so that each of the basic figure boards 31A, 31B may have an individual storage box 6 as shown in FIG. 6 so as to conveniently store the basic figure boards 31A, 31B and the topic boards 32A, 32B, 32B'.

While we have shown and described the embodiment in accordance with the present invention, it should be clear to those skilled in the art that further embodiments may be made without departing from the scope of the present invention.

What is claimed is:

1. A game box, comprising:
    a box having an upper space and a lower space, a drawer connected to the lower space and including at least one chamber;
    an operation portion protruding in the upper space of the box and multiple slots defined in an inside of the operation portion;
    at least one figure board sliding in the slots, wherein the at least one figure board has a map marked thereon and the map includes multiple areas, and wherein the at least one figure board includes holes which are located corresponding to the multiple areas of the map, a transparent base board is slid in the slots and located below the at least one figure board, the at least one index member is inserted into the hole and contacts the base board;
    a light source located between the upper and lower spaces of the box and the light going through the at least one figure board, and
    at least one index member received in the at least one chamber of the drawer and each of the at least one index member being designed corresponding to the one of the at least one figure board.

2. The box as claimed in claim 1, wherein the at least one figure board has tubes which are located corresponding to the multiple areas of the map, the at least one index member is inserted into the tube.

3. The box as claimed in claim 1, wherein the at least one figure board has first connectors which are located corresponding to the multiple areas of the map, the at least one index member includes a second connector.

4. The box as claimed in claim 3, wherein the first and second connectors are magnets.

5. The box as claimed in claim 3, wherein the first and second connectors are connection strips.

6. The box as claimed in claim 1, further comprising a storage box which includes at least one storage slot.

7. The box as claimed in claim 1, wherein the light source is a fluorescent tube.

8. The box as claimed in claim 1, wherein the light source is a light emitting diode.

9. The box as claimed in claim 1, wherein the at least one figure board includes a basic figure board, multiple topic boards and a base board, the topic boards include figures and holes.

10. The box as claimed in claim 1, wherein the at least one figure board includes a basic figure board, multiple topic boards, a combination board and a base board, the topic boards includes figures and the combination board includes holes which are located corresponding to the figures of the topic boards.

11. The box as claimed in claim 10, wherein the base board has recesses which are located corresponding to the holes in the combination board.

\* \* \* \* \*